3,833,603
1-(α,α-DISUBSTITUTED 4-PHENOXY-BENZYL)IMIDAZOLES

Karl-Heinz Buchel, Wilfried Draber, Erik Regel, and Axel Haberkorn, Wuppertal-Elberfeld, Germany, assignors to Farbenfabriken Bayer Aktiengesellschaft, Leverkusen, Germany
No Drawing. Continuation-in-part of abandoned application Ser. No. 130,849, Apr. 2, 1971. This application Oct. 18, 1972, Ser. No. 298,599
Claims priority, application Germany, Apr. 9, 1970, P 20 16 839.2
Int. Cl. C07d 49/36
U.S. Cl. 260—309                16 Claims

ABSTRACT OF THE DISCLOSURE

1 - (4-Phenoxybenzyl)imidazoles bearing a phenyl or alkyl group in the α-position and a second phenyl group in the α-position are effective agents against protozoa. The compounds, of which 1-[α-phenyl-α-(4-biphenylyl)-4-phenoxybenzyl]imidazole is a typical example, can be obtained from the reaction of imidazole and the appropriately substituted α,α-disubstituted-4-phenoxybenzyl halide.

CROSS-REFERENCE

This is a continuation-in-part of Serial No. 130,849, filed April 2, 1971, now abandoned.

DETAILED DESCRIPTION

This invention pertains to a compound selected from the group consisting of a 1-(α,α-disubstituted-4-phenoxybenzyl)imidazole of the formula:

wherein A is phenyl or phenyl substituted by from 1 to 3 substituents selected from the group consisting of fluoro, chloro, alkyl of 1 to 4 carbon atoms, alkoxy of 1 to 4 carbon atoms, phenyl and phenoxy, and
B is alkyl of 1 to 6 carbon atoms, phenyl or phenyl substituted by chloro, fluoro, alkyl of 1 to 4 carbon atoms, alkoxy of 1 to 4 carbon atoms, phenyl or phenoxy
and the pharmaceutically acceptable nontoxic acid addition salts thereof.

The term alkyl denotes straight and branched chain monovalent aliphatic hydrocarbon group having the specified number of carbon atoms, from 1 to 6 in the case of B and from 1 to 4 in the case of the substituents on A and B. Typical groups thus include methyl, ethyl, propyl, isopropyl, butyl, sec.-butyl, isobutyl, tert.butyl, pentyl, neopentyl, hexyl and the like. Alkoxy refers to such groups joined to the remainder of the molecule through an ethereal oxygen atom.

The compounds can be prepared through a variety of methods known to the art. For example, an appropriately substituted α,α-disubstitued 4-phenoxybenzyl halide of the formula:

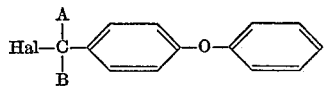

in which Hal is chloro or bromo and A and B are as described above is allowed to react with an approximately molar equivalent amount of imidazole in the presence of an inert organic solvent such as aromatic compounds as for example benzene, aliphatic or cycloaliphatic hydrocarbons as for example hexane and cyclohexane, or aliphatic ethers such as for example diethyl ether. The reaction temperatures are preferably from 20 to 90° C., especially between 30 and 70° C. In addition, one can utilize an acid binding agent such as a tertiary amine as for example triethylamine or dimethylbenzylamine. Alternatively excess imidazole can be employed as the acid binding agent. In this modification, polar organic solvents such as alkanonitriles as for example acetonitrile, alkanones as for example acetone, dimethylformamide or dimethylsulphoxide are employed. Acetonitrile is preferably used as the solvent. The reaction temperatures are from 0 to 100° C., preferably 50 to 85° C.

As indicated, the present invention also pertains to the physiologically acceptable nontoxic acid addition salts of these basic compounds. Such salts include those derived from organic and inorganic acids such as, without limitation, hydrochloric acid, hydrobromic acid, phosphoric acid, sulfuric acid, methane sulphonic acid, acetic acid, tartaric acid, lactic acid, succinic acid, citric acid, malic acid, maleic acid, sorbic acid, acotinic acid, salicyclic acid, phthalic acid, embonic acid, enanthic acid, and the like.

The compounds of the present invention can exist as optical isomers and both the racemates of these isomers and the individual isomers themselves are within the scope of the present invention. The racemates can be separated into their individual isomers through the well known technique and forming diastereoisomeric salts with optical active acids.

The 1 - (α,α-disubstituted-4-phenoxybenzyl)imidazoles of the present invention and the salts thereof have antimicrobial activity against protozoa, piroplasma, trichomonades and amoebae. They also show activity against fungal organisms. One particularly valuable application result from the compounds' high activity against *Trypanosoma cruzi*, the cause of Chagas' disease which is widespread in South and Central America. The compounds are active both orally and parenterally and are well tolerated by warm blooded animals.

In general it has proved advantageous to administer amounts of about 1 mg. to about 20 mg. per kg. of body weight per day to achieve effective results. Nevertheless, it can at times be necessary to deviate from these amounts and in particular to do so as a function of the body weight of the test animal or of the nature of the route by which the substance is administered. In addition, the species of animal and its individual behavior towards the drug, the nature of the formulation of the latter and the point in time or interval at which it is administered should be considered. In some cases, less than 1 mg./kg. can be effective while in others more than 20 mg./kg. must be employed. In the latter instance, it is advisable to divide the total daily dose into several individual administrations.

The present invention provides pharmaceutical compositions containing as an active ingredient at least one of the new 1-(α,α-disubstituted-4-phenoxyphenyl)imidazoles or a pharmaceutically acceptable salt thereof, in admixture with a pharmaceutically acceptable carrier.

The expression "pharmaceutically acceptable carrier" means a nontoxic substance that when mixed with the active ingredient or ingredients renders it more suitable for administration. The expression preferably excludes water and low-molecular weight organic solvents commonly used in chemical synthesis, except in the presence of other pharmaceutically necessary ingredients such as salts in correct quantities to render the composition isotonic, buffers, surfactants, coloring agents, flavoring agents, and preservatives. Examples of suitable liquid carriers include vegetable oils, polyols, buffered aqueous solutions, isotonic saline aqueous solutions and syrups. Examples of suitable solid diluents and carriers are starches, cellulose and its derivatives, sugars and the like.

One preferred form of pharmaceutical compositions of the invention are those adapted for oral administration. The diluents and carriers used can preferably therefore be those that adapt the active ingredient or ingredients for oral administration. Examples of such diluents and carriers are solid vehicles, excipients and lubricants such as glucose, lactose and sucrose, corn and potato starch, sodium carboxymethylcellulose, ethyl cellulose and cellulose acetate, powdered gum tragacanth, gelatin, alginic acid, agar, stearic acid and sodium, calcium and magnesium stearates, sodium lauryl sulphate, polyvinyl-pyrrolidone, sodium citrate, calcium carbonate and dicalcium phosphate.

The pharmaceutical compositions of the invention may also contain other nontoxic adjuvants and modifiers such as dyes, surfactants, perfumes, flavoring agents, preservatives and biocides.

Further preferred pharmaceutical compositions of the invention are those adapted for parenteral injection. The diluents and carriers used can, therefore, preferably be those that present the active ingredient in a form suitable for parenteral administration. Examples of such diluents and carriers are solvents and suspending diluents such as water and water-miscible organic solvents. Examples of pharmaceutical compositions of the invention are sterile isotonic saline aqueous solutions of the active ingredient, which may be buffered with a pharmaceutically acceptable buffer and are preferably pyrogen-free.

The pharmaceutical compositions of the invention preferably contain 0.5 to 90 wt. percent of the 1-($\alpha,\alpha$-disubstituted 4-phenoxybenzyl)imidazole of the invention or a nontoxic salt thereof.

The following examples will serve to further typify the nature of this invention without being a limitation on the scope thereof.

EXAMPLE 1

Bisphenyl-(4-phenoxyphenyl)-1-imidazoyl-methane 2.1 g. (0.06 mol) of imidazole and 11.1 g. (0.03 mol) of bisphenyl-(4-phenoxyphenyl)-chloromethane are dissolved in 100 ml. of anhydrous acetonitrile and heated under reflux for 3 to 4 hours. Thereafter, the acetonitrile is distilled off in vacuo and the residue is washed with water and dried over $Na_2SO_4$. After stripping off the methylene chloride, an oily product remains, which crystallizes from a little methyl ethyl ketone. 9.6 g. (80% of theory) of the product 1-($\alpha,\alpha$-diphenyl-4-phenoxybenzyl)imidazole having the formula:

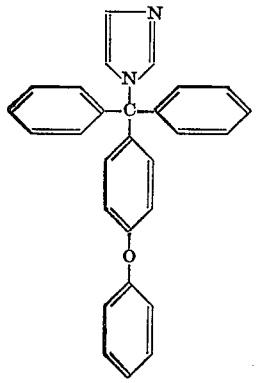

are obtained in the form of colorless crystals of melting point 141–144° C. The hydrochloride salt demonstrates a melting point of 156° C.

The bisphenyl-(4-phenoxyphenyl)-chloromethane employed as the starting compound can be obtained as follows:

1 mol of diphenyl-ether is dissolved in 500 ml. of absolute carbon tetrachloride, a trace of $SO_2$ is added, and 170 g. of bromine in 200 ml. of carbon tetrachloride are added dropwise at room temperature. After stirring overnight, and evaporating the solvent in vacuo, the residue is distilled in vacuo.

Boiling point 157–159° C. (13 mm. Hg) $\cdot n_D^{20}$=1.621
Yield: 89% of theory.

0.1 mol of p-bromo-diphenyl-ether is dissolved in 100 ml. of absolute tetrahydrofuran and added dropwise to a suspension of 0.13 mol of magnesium in 30 ml. of absolute tetrahydrofuran. When all the magnesium has dissolved, the mixture is stirred for a further half hour and 0.1 mol of benzophenone, dissolved in tetrahydrofuran, is added dropwise. After completion of the addition, the mixture is heated at boiling for a further 3 hours. Thereafter, the reaction solution is hydrolyzed in ice/hydrochloric acid and diluted with methylene chloride. The organic phase is separated off and dried over sodium sulfate. After stripping off the methylene chloride in vacuo, an oily residue remains, which is difficult to recrystallize, corresponding to bisphenyl-(4-phenoxyphenyl)-methylcarbinol. After some time, the oil solidifies to a waxy substance.

0.1 mol of bisphenyl-4-(4-phenoxyphenyl)-methylcarbinol is dissolved in 150 ml. of chloroform and treated with 0.11 mol of thionyl chloride with stirring. When the evolution of gas has ceased, the solvent is stripped off in vacuo. A brown oily residue remains, which is degassed in vacuo. The compound thus obtained is bisphenyl-(4-phenoxyphenyl)-chloromethane and is not crystallizable.

Other chlorides are prepared analogously to bisphenyl-(4-phenoxyphenyl)-methyl chloride, using benzophenones with different substituents; for example, it is possible to manufacture p,p'-dichloro-bisphenyl-(4-phenoxyphenyl)-methyl chloride, 3,4-dichloro-bisphenyl - (4 - phenoxyphenyl)-methyl chloride and 2-fluoro-bisphenyl-(4-phenoxyphenyl)-methyl chloride.

EXAMPLE 2

Bis-(4-phenoxyphenyl)-phenyl-imdazol-1-yl-methane 44.5 g. of bis-(4-phenoxyphenyl)-phenylcarbinol (0.1 mol) in 200 ml. of methylene chloride are treated with 13 g. (0.1 mol) of thionyl chloride, with cooling in ice. After completion of the evolution of gas, the mixture is concentrated, the residue is taken up in anhydrous acetonitrile, and the solution is added dropwise to a boiling solution of 16.9 g. (0.25 mol) of imidazole in 100 ml. of acetonitrile. The mixture is heated at boiling for 30 minutes and concentrated, and the residue is taken up in ether. The ether solution is extracted with water, filtered using active charcoal, dried and concentrated. The oily, brown residue is repeatedly extracted by boiling with petroleum ether. After concentrating the petroleum ether extracts, a light yellow oil remains, which crystallizes after prolonged standing to yield 10.6 g. (22% of theory) of the product, m.p. 140° C., and having the formula:

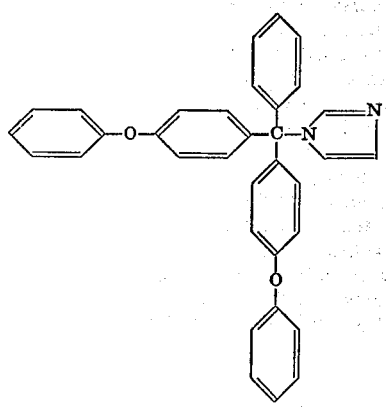

This compound can also be named as 1-[$\alpha,\alpha$-bis(4-phenoxyphenyl)-benzyl]imidazole.

The bis-(4-phenoxyphenyl)-phenylcarbinol employed as the starting compound can be obtained in the following manner:

A Grignard solution is prepared from 7.49 g. (0.3 mol) of 4-bromodiphenyl-ether, 7.3 g. (0.3 mol) of magnesium filings and 300 ml. of absolute ether, and is added dropwise, at room temperature, to 82.3 g. (0.3 mol) of phenyl-4-phenoxyphenyl-ketone in 500 ml. of ether. Thereafter the mixture is stirred for a further 5 hours and is then boiled for 5 hours under reflux. After treating the ethereal phase with ice and hydrochloric acid, neutralizing, drying and concentrating, 66.3 g. (50% of theory of the carbinol α,α-[bis-4(-phenoxyphenyl)]benyl alcohol having the formula:

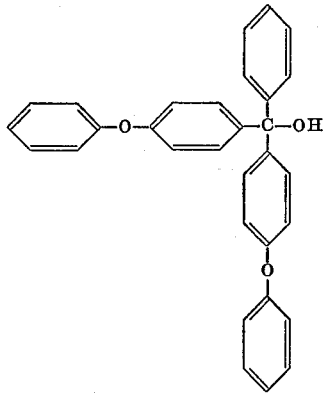

are obtained as a viscous, light yellow oil.

Other starting compounds of this type are obtainable analogously.

EXAMPLE 3-11

In a similar fashion to that described in Examples 1 and 2, the following compounds are obtained:

Example No. Compound
3  1-[α,α-bis( 4 chlorophenyl) - 4 - phenoxybenyl]imidazole, m.p. 136° C.
4  1-[α-phenyl-α-(3,4 - dichlorophenyl)-4 - phenoxybenzyl]imidazole, m.p. 146° C.
5  1-[α-phenyl-α-(2 - fluorophenyl)-4-phenoxybenxyl]-imidazole, m.p. 190° C. (HCl)
6  1 - (α-tert.butyl-α-phenyl-4 - phenoxybenzyl)-imidazole, oil
7  1-[α-tert.butyl-α-(4 - fluorophenyl)-4 - phenoxylbenzyl]imidazole, oil
8  1-[α-tertbutyl-α-(2 - fluorophenyl)-4 - phenoxybenzyl]imidazole, oil
9  1 - [α-phenyl-α-(4-biphenylyl) - 4-phenoxylbenzyl]-imidazole, m.p. 159° C.
10  1-[α-(4 - biphenylyl) - α - isopropyl - 4 - phenoxylbenzyl]-imidazole, m.p. 145° C. and
11  1 - [α,α - bis(4-phenoxyphenyl)-2-chlorobenzyl]imidazole, m.p. 197° C.

EXAMPLE 12

NMRI mice weighing an average of 18 to 22 g. were subcutaneously infected with $10^6$ trypanosomes. Treatment was started one day after infection and was carried out on four successive days, in each case at intervals of 24 hours. 1 to 4 animals were employed per dose. Blood samples of the treated animals were microscopically examined daily, apart from weekends, for trypanosomes, in comparison to infected untreated control animals. The first blood test was carried out seven days after infection. At this point in time the untreated control animals showed a very pronounced parasitaemia. If the *first* trypanosomes were only found on the 8th day after infection, or later, the finding is described as an effect. If the animals were parasitologically negative up to 28 days after infection, they were reinfected. Normal development of this reinfection is treated as proof of a "cure," since the animals in this case have to be free of trypanosomes. If the reinfection only led to a delayed course of the infection, the finding is quoted as an "effect."

The description "trace effect" is employed if parasitaemia is observable from the seventh day after infection onwards but the number of parasites is distinctly less than in the case of control animals. Additionally the survival time must be extended as compared to the controls.

A clear effect is detectable on treating the mice, experimentally infected with Trypanosoma cruzi, for only four days. A further noteworthy feature is the partly broad therapeutic indices (= ratio of maximum tolerated dose to minimum effective dose) of 1:10 to 1:50.

| Compound number | Administration | Dose, mg./kg. (4×) | | | | | | |
|---|---|---|---|---|---|---|---|---|
| | | 1,000 | 500 | 250 | 100 | 50 | 25 | 10 |
| Example: | | | | | | | | |
| 4 | P.o. | 2 | 2 | 2 | 1 | 0 | | |
| 6 | P.o. | *2 | 2 | 2 | 2 | 1 | 0 | |
| 9 | S.c. | 3 | 3 | 3 | 3 | 3 | 1 | 0 |
| | P.o. | 3 | 3 | 3 | 3 | 3 | 1 | 0 |

0=Ineffective; 1=trace effect; 2=effect; 3=cure, *=toxic.

EXAMPLE 13

Four to eight NMRI-(Han.) spf mice (18 to 20 g.) were treated once subcutaneously at various times *before* infection. Infection was effected with $1 \times 10^6$ trypanosomes of the virulent T. *cruzi* strain "Tulahuen." The assessment of the prophylactic effect utilized the same criteria applied as are stated for the experiments for proving the therapeutic effectiveness.

A one-time subcutaneous administration of 500 and 1000 mg./kg. of 1-[α-phenyl-α-(4-biphenylyl)-4-phenoxybenzyl]imidazole prevented the inception of the infection, even when this was not effected until 5 weeks after medication. Six weeks after treatment, there could still be observed in the case of the animals pretreated with 500 mg./kg., a 50%, and in the case of the mice treated with 1000 mg./kg., an 80%, protective effect. In some instances a still longer lasting protective effect can be observed in the case of four-time application and use of a different *Trypinosoma cruzi* strain ("WBH").

What is claimed is:

1. A compound selected from the group consisting of 1-(α,α-disubstituted - 4 - phenoxybenzyl)imidazole of the formula:

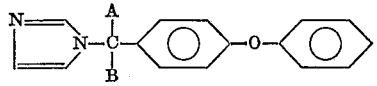

wherein
A is phenyl or phenyl substituted by fluoro, chloro, or phenyl, and
B is alkyl of 1 to 6 carbon atoms, phenyl, dichlorophenyl or phenyl substituted by chloro, fluoro, alkyl of 1 to 4 carbon atoms, alkoxy of 1 to 4 carbon atoms, phenyl or phenoxy
and the pharmaceutically acceptable nontoxic acid addition salts thereof.

2. A compound according to claim 1 wherein B is alkyl of 1 to 6 carbon atoms.

3. A compound according to claim 1 wherein B is phenyl, dichlorophenyl or phenyl substituted by chloro, fluoro, alkyl of 1 to 4 carbon atoms, alkoxy of 1 to 4 carbon atoms, phenyl or phenoxy.

4. A compound according to claim 1 wherein
A is phenyl, chlorophenyl, fluorophenyl, or biphenyl, and
B is isopropyl, tert.-butyl, phenyl, chlorophenyl, dichlorophenyl, fluorophenyl, biphenyl or phenoxyphenyl.

5. A compound according to claim 1 in the form of the hydrochloride salt.

6. The compound according to claim 1 which is 1-(α,α-diphenyl-4-phenoxybenzyl)imidazole.

7. The compound according to claim 1 which is 1-[α,α-bis(4-phenoxyphenyl)-benzyl]imidazole.

8. The compound according to claim 1 which is 1-[α,α-bis(4-chlorophenyl)-4-phenoxybenzyl]imidazole.

9. The compound according to claim 1 which is 1-[α-phenyl-α-(3,4-dichlorophenyl) - 4 - phenoxybenzyl]-imidazole.

10. The compound according to claim 1 which is 1-[α-phenyl-α-(2-fluorophenyl) - 4 - phenoxybenzyl]imidazole.

11. The compound according to claim 1 which is 1-(α-tert.butyl-α-phenyl-4-phenoxybenzyl)imidazole.

12. The compound according to claim 1 which is 1-[α-tert.butyl-α-(4-fluorophenyl)-4-phenoxybenzyl]imidazole.

13. The compound according to claim 1 which is 1-[α-tert.butyl-α-(2-fluorophenyl)-4-phenoxybenzyl]imidazole.

14. The compound according to claim 1 which is 1-[α-phenyl-α-(4-biphenylyl)-4-phenoxybenzyl]imidazole.

15. The compound according to claim 1 which is 1-[α-(4-biphenylyl)-α-isopropyl - 4 - phenoxybenzyl]imidazole.

16. The compound according to claim 1 which is 1-[α,α-bis(4-phenoxyphenyl)-2-chlorobenzyl]imidazole.

References Cited

UNITED STATES PATENTS 3,647,815   3/1972   Hegedus _____ 260—309

FOREIGN PATENTS 2,007,794   9/1971   Germany _____ 260—309

OTHER REFERENCES

Godefroi et al., Chem. Abst. vol. 72, No. 90,466v (1970).

NATALIE TROUSOF, Primary Examiner

U.S. Cl. X.R.

260—612 R; 424—273